United States Patent
Okuda et al.

(10) Patent No.: US 10,864,907 B2
(45) Date of Patent: Dec. 15, 2020

(54) VEHICLE CONTROL DEVICE AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Yasuo Okuda, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 15/740,599

(22) PCT Filed: Jun. 7, 2016

(86) PCT No.: PCT/JP2016/066919
§ 371 (c)(1),
(2) Date: Dec. 28, 2017

(87) PCT Pub. No.: WO2017/002553
PCT Pub. Date: Jan. 5, 2017

(65) Prior Publication Data
US 2018/0154890 A1    Jun. 7, 2018

(30) Foreign Application Priority Data
Jun. 30, 2015    (JP) .................. 2015-131131

(51) Int. Cl.
*B60W 30/09*    (2012.01)
*B60W 40/10*    (2012.01)
(Continued)

(52) U.S. Cl.
CPC ............ *B60W 30/09* (2013.01); *B60W 10/06* (2013.01); *B60W 10/18* (2013.01); *B60W 40/10* (2013.01);
(Continued)

(58) Field of Classification Search
CPC ...... B60W 30/09; B60W 10/06; B60W 10/18; B60W 40/10
See application file for complete search history.

(56) References Cited

U.S. PATENT DOCUMENTS
2018/0326852 A1*  11/2018  Shiozawa ................ B60L 9/18

FOREIGN PATENT DOCUMENTS
JP    2014-91351 A    5/2014

* cited by examiner

*Primary Examiner* — Michael D Lang
(74) *Attorney, Agent, or Firm* — Maschoff Brennan

(57) ABSTRACT

A vehicle control ECU is configured to determine the presence or absence of an object ahead of a vehicle in its traveling direction. The vehicle control ECU is configured to, if an object has been detected, raise a driving force command value in the vehicle in a stepwise manner such that the driving force command value does not exceed a request value determined based on an accelerator position designated by a driver until the speed of the vehicle reaches a predetermined speed, and lower the driving force command value after the speed of the vehicle reaches the predetermined speed. The vehicle control ECU is configured to calculate the slope of a road on which the vehicle runs. The vehicle control ECU is configured to change the increase rate per time for raising the driving force command value based on the slope.

4 Claims, 4 Drawing Sheets

(51) Int. Cl.
    *G08G 1/16*          (2006.01)
    *G01S 15/931*       (2020.01)
    *B60W 10/06*        (2006.01)
    *B60W 10/18*        (2012.01)

(52) U.S. Cl.
    CPC ............ *G01S 15/931* (2013.01); *G08G 1/165* (2013.01); *G08G 1/168* (2013.01); *B60W 2420/54* (2013.01); *B60W 2520/105* (2013.01); *B60W 2552/15* (2020.02); *B60W 2554/00* (2020.02)

VEHICLE CONTROL DEVICE AND VEHICLE CONTROL METHOD

CROSS-REFERENCE TO RELATED APPLICATION

This application is based on and claims the benefit of priority from earlier Japanese Patent Application No. 2015-131131 filed on Jun. 30, 2015, the description of which is incorporated herein by reference.

TECHNICAL FIELD

The present disclosure relates to a vehicle control technique for detecting an object that is present ahead of a vehicle in its traveling direction to control the vehicle.

BACKGROUND ART

A conventionally proposed technique for improving vehicle traveling safety includes detecting an object (obstacle) such as a preceding vehicle and a pedestrian that is present around the vehicle with an ultrasonic sensor mounted in the vehicle, and performing various types of control for improving the vehicle traveling safety based on the detection result. The various types of control are exemplified by the operation of a braking device, notification to a driver, and the like.

For example, Patent Literature 1 discloses control of gradually raising the driving force until the speed of a vehicle reaches a predetermined speed while an object is detected ahead of the vehicle in its traveling direction, and lowering the driving force after the speed of the vehicle reaches the predetermined speed. Even while an object is detected, the control technique disclosed in Patent Literature 1 enables the vehicle to avoid a collision with the object and provides the driving force required for starting the vehicle.

CITATION LIST

Patent Literature

[PTL 1] JP 2014-91351 A

SUMMARY OF THE INVENTION

Technical Problem

When an object is detected ahead of a vehicle in its traveling direction, and the vehicle is about to run in a place including an uphill slope such as an uphill road, the start of the vehicle may be delayed due to the slope. In such a case, the driving force can excessively increase by the time the vehicle starts to move under the conventional control. Therefore, a delay in stopping the vehicle may occur under the conventional control even though the driving force is lowered after the vehicle starts to move, and the vehicle may end up reaching the object.

An object of the present disclosure is to provide a vehicle control device that enables a vehicle to avoid a collision with an object while appropriately generating the driving force required for starting the vehicle in a place including an uphill slope, and a vehicle control method that is executed by the vehicle control device.

Solution to Problem

Hereinafter, solutions to the above problem and the effects thereof will be described.

A vehicle control device according to the present disclosure includes an object determination unit (21), a driving force control unit (22), a slope calculation unit (23), and an increase rate changing unit (24). The object determination unit is configured to determine the presence or absence of an object ahead of a vehicle (10) in its traveling direction. The driving force control unit is configured to, in the case where the presence of the object has been determined, raise a driving force command value in the vehicle in a stepwise manner such that the driving force command value does not exceed a request value determined based on an accelerator position designated by a driver, until the speed of the vehicle reaches a predetermined speed, and lower the driving force command value after the speed of the vehicle reaches the predetermined speed. The slope calculation unit is configured to calculate the slope of a road on which the vehicle runs. The increase rate changing unit is configured to change the increase rate per time for raising the driving force command value based on the slope.

Owing to the above-mentioned configuration, the vehicle control device according to the present disclosure changes the raising change rate for the driving force command value based on the slope of a road in the case where the actual driving force increases as the driving force command value is raised. In short, the vehicle control device according to the present disclosure changes the increase rate per time based on the slope. Therefore, in a vehicle including the vehicle control device according to the present disclosure, the actual driving force moderately increases. Consequently, the vehicle control device according to the present disclosure suppresses an excessive rise in the actual driving force due to a delay in starting the vehicle on an uphill slope. As a result, the vehicle control device according to the present disclosure enables the vehicle to avoid a collision with an object while appropriately generating the driving force required for starting the vehicle in a place including an uphill slope (e.g., uphill road).

DESCRIPTION OF THE EMBODIMENTS

A vehicle control device according to the present embodiment is mounted on a vehicle (own vehicle) having an engine as a driving source. The vehicle control device detects an object (obstacle) present ahead of the own vehicle in its traveling direction to perform control for enabling the vehicle to avoid a collision with the object.

Figure 1:
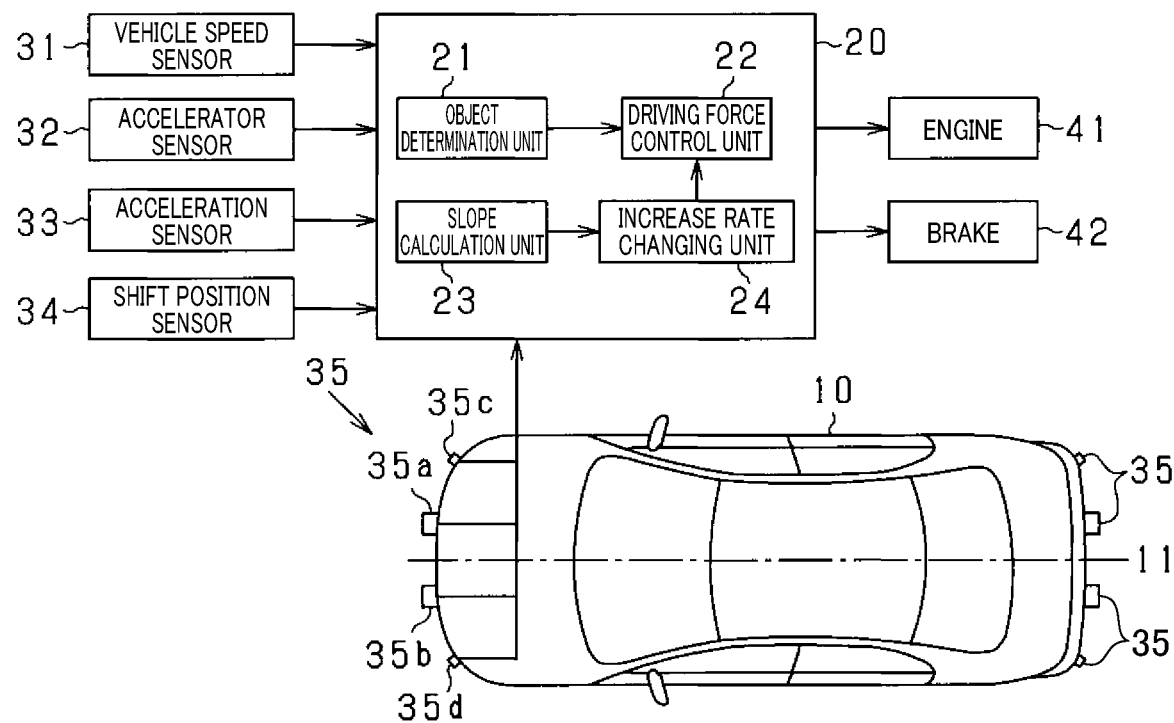
FIG. 1 is a schematic configuration diagram of a vehicle control system.

Hereinafter, a schematic configuration of a vehicle control system to which the vehicle control device according to the present embodiment is applied will be described using FIG. 1. As illustrated in FIG. 1, a vehicle 10 includes a vehicle control ECU 20 that serves as the vehicle control device. The vehicle 10 also includes various sensors such as a vehicle speed sensor 31, an accelerator sensor 32, an acceleration sensor 33, a shift position sensor 34, and ranging sensors 35. The sensors 31 to 35 are connected to the vehicle control ECU 20.

The vehicle speed sensor 31 outputs pulse signals at predetermined intervals. The specific method therefor used in the present embodiment (electromagnetic pickup method) includes outputting pulse signals at predetermined intervals when a plurality of projecting parts provided on a rotor that rotates in conjunction with a wheel passes the wheel speed sensor 31, and detecting the output pulse signals. The detection results of the vehicle speed sensor 31 (detected pulse signals) are transmitted to the vehicle control ECU 20. The vehicle control ECU 20 calculates the speed of the vehicle based on the pulse intervals of the detected signals. The accelerator sensor 32 detects the accelerator opening degree representing to what extent an accelerator pedal has been pressed. The detection result of the accelerator sensor 32 (accelerator opening degree information) is transmitted to the vehicle control ECU 20.

The acceleration sensor 33 detects the acceleration of the vehicle 10 based on the force applied to the sensor itself. Typical examples of the acceleration sensor 33 include an electrostatic capacitance type and a piezoresistive element type. The reference state for the acceleration sensor 33 is a state where the gravitational acceleration vertically acts on the stationary vehicle 10 on a flat road (horizontal plane). Specifically, in the case where the stationary vehicle 10 on an uphill road is oriented in the uphill slope direction that is the traveling direction, a value that depends on the uphill grade is detected as the acceleration in the traveling direction in consideration of the gravitational acceleration. The detection result of the acceleration sensor 33 (acceleration information of the vehicle 10) is transmitted to the vehicle control ECU 20. The shift position sensor 34 detects the shift position (shift range, i.e., the position of a shift lever with which the gear state of a transmission is designated) of a shift device (not illustrated). The detection result of the shift position sensor 34 (current shift position information) is transmitted to the vehicle control ECU 20.

Each of the ranging sensors 35 is an ultrasonic sensor. For example, the ranging sensor 35 uses ultrasound in the 20 to 100 kHz range as probe waves, and receives the probe waves reflected from an object as reflected waves. The ranging sensor 35 detects the object that is present around the vehicle 10 based on the result of receiving the reflected waves. In the present embodiment, four ranging sensors 35 are attached to the front part (e.g., anterior bumper) of the vehicle side by side at predetermined intervals in the vehicle width direction (lateral direction) orthogonal to the traveling direction (longitudinal direction) of the vehicle 10. Specifically, two center sensors 35a and 35b (first sensor 35a and second sensor 35b) are attached to the front part of the vehicle at axisymmetrical positions with respect to a symmetrical axis, i.e., a center line 11 of the vehicle 10. Two corner sensors 35c and 35d (right corner sensor 35c and left corner sensor 35d) are attached to the front part of the vehicle at the positions of the right and left corners, respectively. The ranging sensors 35 are also attached to the rear part (e.g., posterior bumper) of the vehicle 10. Since the attachment positions and functions of the sensors on the rear part of the vehicle are the same as those of the ranging sensors 35 on the front part of the vehicle, the description thereof is omitted here. The detection results of the ranging sensors 35 (detection information of the object that is present around the vehicle) are transmitted to the vehicle control ECU 20.

The vehicle control ECU 20 is a computer including a CPU, a memory (e.g., ROM and RAM) and an I/O. The CPU executes, for example, a program stored in the ROM, whereby the vehicle control ECU 20 performs various types of control for vehicle control and drive assist (implements each function to be described later). For example, the vehicle control ECU 20 performs control for drive assist by outputting a control signal for controlling an engine 41 or a brake 42 to avoid a collision between the vehicle 10 and an object.

The vehicle control ECU 20 performs the function of avoiding a collision by performing control to suppress the driving force of the engine 41 in the case where the vehicle 10 moves closer to an object (hereinafter referred to as "driving force suppression control" for convenience). Specifically, the vehicle control ECU 20 implements functions including an object determination unit 21, a driving force control unit 22, a slope calculation unit 23, and an increase rate changing unit 24.

The object determination unit 21 determines the presence or absence of an object around the vehicle (ahead of the vehicle 10 in its traveling direction). The object determination unit 21 determines the presence or absence of an object around the vehicle based on the detection information of the object transmitted from the ranging sensors 35. Specifically, the object determination unit 21 first transmits control signals to the ranging sensors 35, and instructs the ranging sensors 35 to transmit probe waves at predetermined transmission time intervals (e.g., intervals of a hundred to several hundred milliseconds). In response to the detection information of the object being transmitted from the ranging sensors 35, the object determination unit 21 determines the presence or absence of the object ahead of the vehicle 10 in its traveling direction based on the detected information. At this time, the object determination unit 21 determines the presence or absence of the object ahead of the vehicle if the vehicle 10 is in an advancing state (forward-moving state). In contrast, the object determination unit 21 determines the presence or absence of the object behind the vehicle if the vehicle 10 is in a reversing state (backward-moving state).

The driving force control unit 22 controls the driving force of the engine 41 using a variable driving force command value Fi. The driving force control unit 22 suppresses the driving force of the engine 41 by varying the driving force command value Fi with respect to a request value f0 (driving force requested from a driver) determined based on the accelerator position information transmitted from the accelerator sensor 32. The driving force control unit 22 performs the suppression control in the case where the presence of an object ahead of the vehicle 10 in its traveling direction has been determined by the object determination unit 21 and if the object is located within a predetermined distance, i.e., a criterion for determining whether to perform the driving force suppression. Specifically, the driving force control unit 22 makes the driving force command value Fi indicating the driving force of the engine 41 smaller than the request value f0 in the case where the presence of the object has been determined and if the object is located within the predetermined distance. The driving force suppression for the engine 41 can be implemented, for example, through restrictions on the amount of intake air or throttle position.

For example, suppose the vehicle 10 moves to approach an object on an uphill slope such as an uphill road or on an uneven road. In such a case, if the driving force of the engine 41 is suppressed, a driver can no longer cause the vehicle 10 to move even though the driver intends to approach the object. In this regard, in a situation where the driving force of the engine 41 is suppressed, if the start of the vehicle 10 is restricted due to the driving force suppression, the driving force control unit 22 performs control to gradually raise the driving force of the engine 41. Specifically, the driving force control unit 22 gradually raises the driving force command value Fi (gradually increases the driving force) such that the driving force command value Fi does not exceed the request value f0 until the speed of the vehicle calculated based on the detection result of the vehicle speed sensor 31 reaches a predetermined speed. After the speed of the vehicle reaches the predetermined speed, the driving force control unit 22 lowers the driving force command value Fi (gradually reduces the driving force).

Figure 2A:
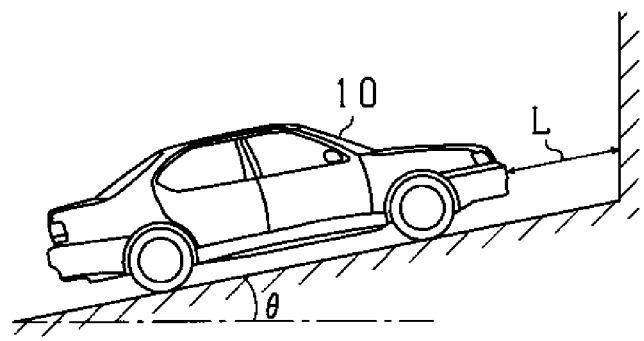
FIG. 2A is a diagram illustrating a situation where a vehicle approaches an object on an uphill road.
Figure 2B:
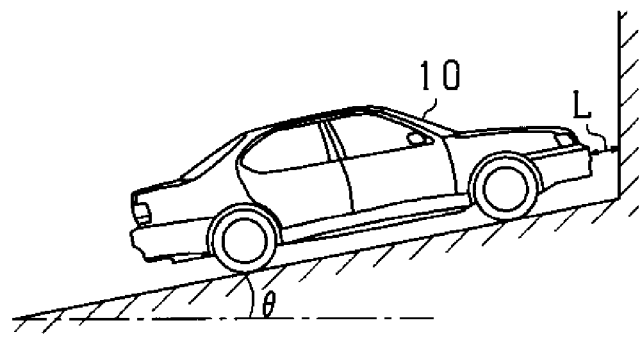
FIG. 2B is a diagram illustrating the situation where the vehicle approaches the object on the uphill road.

Hereinafter, a situation where the vehicle 10 is about to be parked on an uphill road while it is approaching an object will be described using FIGS. 2A and 2B. FIGS. 2A and 2B are based on the assumption that the vehicle 10 is stationary on a slope (uphill road) with an uphill grade θ and then moves upward along the slope.

As illustrated in FIG. 2A, there is a wall ahead of the vehicle 10 in its traveling direction, that is, on the upward side of the uphill slope. The vehicle 10 and the wall are close to each other. In such a situation, when a driver tries to bring the vehicle 10 closer to the wall, the driving force suppression is performed since the distance L to the wall is short. Furthermore, the start of the vehicle 10 is restricted due to the running resistance on the uphill slope. At this time, the vehicle control ECU 20 gradually raises the driving force command value Fi to increase the driving force of the engine 41. Consequently, the stationary vehicle 10 on the uphill slope is started, so that the distance L between the vehicle 10 and the wall can be further reduced as illustrated in FIG. 2B. After that, when the distance L to the wall falls below a stop distance, the vehicle 10 is stopped by means of brake control.

In the case where an object has been detected ahead of the vehicle 10 in its traveling direction, if the vehicle 10 is about to run in a place including an uphill slope such as an uphill road, the start of the vehicle 10 may be delayed due to the uphill slope. In such a case, the actual driving force of the engine 41 is liable to excessively increase as the driving force command value Fi is raised until the vehicle 10 starts to move.

Specifically, on an uphill road, it takes time to generate the driving force required for starting the vehicle 10 due to the uphill slope, which causes a difference between the driving force command value Fi and the actual driving force. In the case where the driving force command value Fi is further raised during such a state (by the time the vehicle 10 starts to move), the actual driving force undergoes a rapid rising change. As a result, on the uphill road, the actual driving force excessively increases by the time the vehicle 10 starts to move. Therefore, a delay in stopping the vehicle 10 may occur on the uphill road even though the driving force command value Fi is lowered after the vehicle 10 starts to move, and the vehicle 10 may end up reaching the object.

In this regard, according to the present embodiment, the vehicle control ECU 20 is configured to have the slope calculation unit 23 and the increase rate changing unit 24. The slope calculation unit 23 calculates the slope of a road on which the vehicle 10 is running (for example, uphill grade θ in the case of an uphill road). The increase rate changing unit 24 changes the raising amount with respect to the time spent on raising the driving force command value Fi based on the slope calculated by the slope calculation unit 23. In short, the increase rate changing unit 24 changes the increase rate per time (unit time) based on the slope. At this time, the increase rate changing unit 24 performs the change such that the driving force command value Fi does not exceed the request value f0 determined based on the accelerator position. Specifically, after the driving force suppression is started in response to the accelerator being turned on, the increase rate changing unit 24 sets the time that elapses before the driving force command value Fi is raised from an initial value f1 (raising start time Td) such that the time is longer at larger uphill grades θ. Consequently, the increase rate changing unit 24 changes the increase rate for the driving force command value Fi. In other words, the increase rate changing unit 24 changes the timing for raising the driving force command value Fi from the initial value f1 after the driving force suppression is started, thereby changing the increase rate. During this process, the increase rate changing unit 24 changes the increase rate such that smaller increase rates are applied at larger uphill grades θ. In this manner, in the present embodiment, the raising start time Td is increased, whereby the difference between the driving force command value Fi and the actual driving force is reduced. In addition, in the present embodiment, the actual driving force undergoes a modest rising change at the beginning of the rise in the driving force command value Fi (initial rise in the driving force is moderated).

Figure 3:
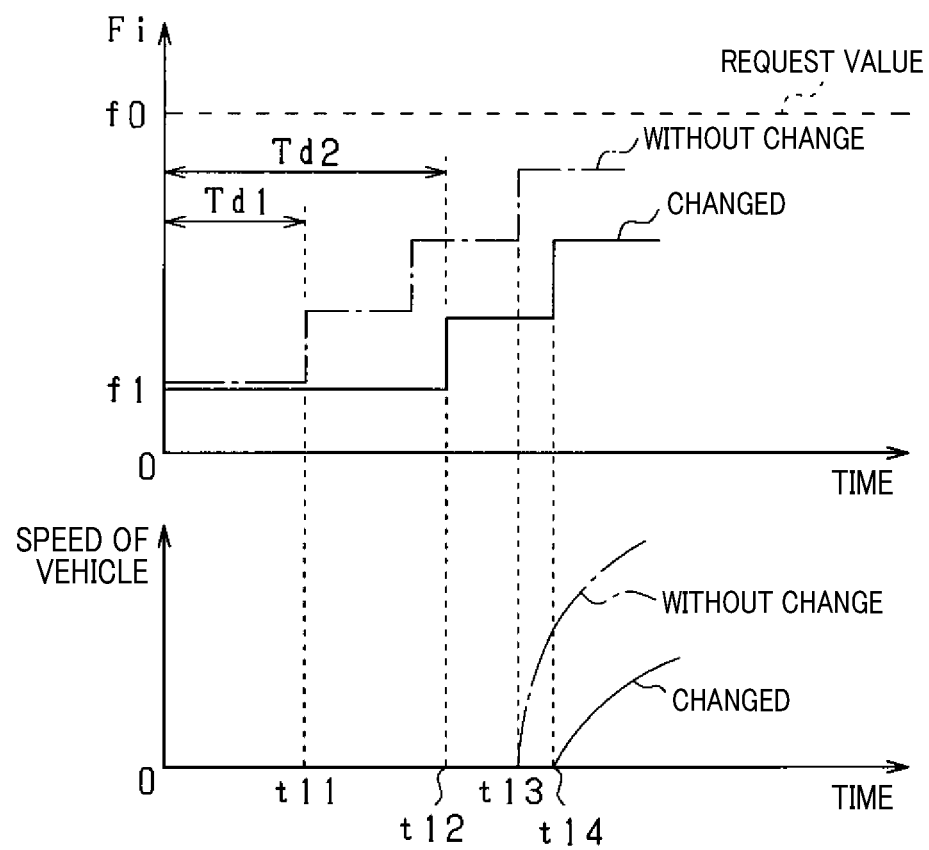
FIG. 3 is a diagram illustrating the relation between a driving force command value and the speed of a vehicle.

Hereinafter, the relation between temporal variations in the driving force command value Fi and temporal variations in the speed of the vehicle associated with a change in the raising start time Td will be described using FIG. 3. In FIG. 3, the dashed-dotted line indicates the temporal variations in the driving force command value Fi without a change in the raising start time Td (raising start time Td remains the same as the initial value). The solid line indicates the temporal variations in the driving force command value Fi associated with the change in the raising start time Td (raising start time Td is increased).

On an uphill road, in the case where the accelerator is turned on while an object is detected ahead of the vehicle 10 in its traveling direction, the driving force command value Fi is reduced to the initial value f1 that is smaller than the request value f0 determined based on the accelerator position corresponding to the accelerator operation. In the case where the raising start time Td has not been changed, the driving force command value Fi starts to be raised at timing t11 after time Td1 passes. After the driving force command value Fi starts to be raised, the driving force command value Fi is raised (raised in a stepwise manner) by predetermined amounts (raising amounts) at predetermined intervals (e.g., raising intervals of 1 msec or the like), and the vehicle 10 starts to move at timing t13. After the vehicle 10 starts to move, it is accelerated in accordance with the increased driving force.

In contrast, in the case where the raising start time Td has been changed, the driving force command value Fi starts to be raised at timing t12 after time Td2 passes. After the driving force command value Fi starts to be raised, the driving force command value Fi is raised by predetermined amounts, and the vehicle 10 starts to move at timing t14. After the vehicle 10 starts to move, it is accelerated in accordance with the increased driving force. In this manner, in the case where the raising start time Td has been changed, the vehicle 10 starts to move with the smaller driving force command value Fi, as compared with the case where the raising start time Td has not been changed. Therefore, the initial rising change in the speed of the started vehicle is moderated.

Figure 4:
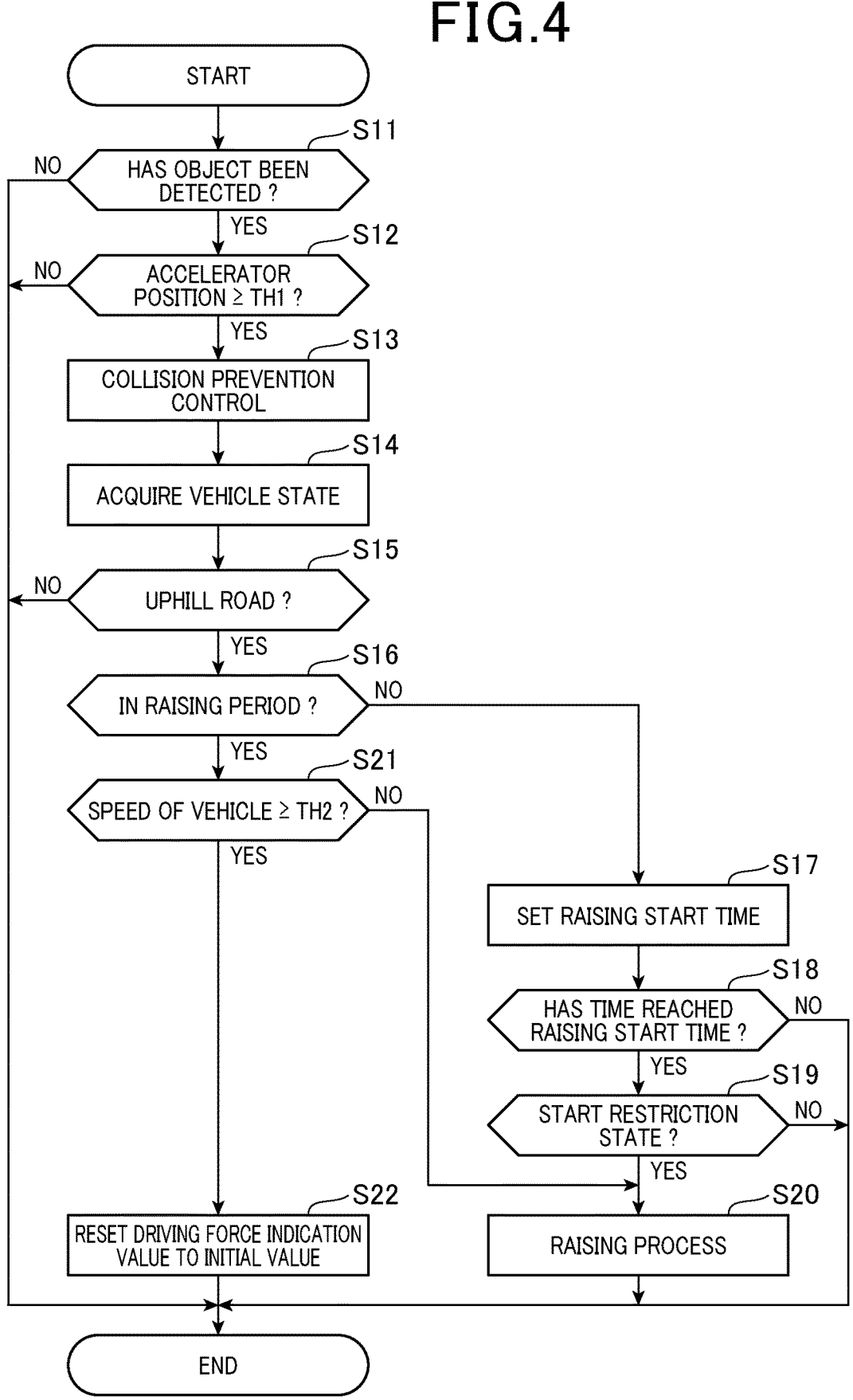
FIG. 4 is a flowchart illustrating a process for driving force suppression control.

Hereinafter, a processing procedure for the driving force suppression control that is executed by the vehicle control ECU 20 will be described using FIG. 4. This process is executed by the vehicle control ECU 20 at predetermined intervals.

The vehicle control ECU 20 determines whether an object has been detected within a predetermined distance ahead of the vehicle 10 in its traveling direction (S11). The determination process is performed by the object determination unit 21 provided in the vehicle control ECU 20. The predetermined distance is one of the determination criteria (determination values) for determining whether to perform the driving force suppression, and the driving force suppression is performed if an object is detected within the predetermined distance. If it is determined that an object has not been detected (NO at S11), the vehicle control ECU 20 ends the process. In contrast, if it is determined that an object has been detected (YES at S11), the vehicle control ECU 20 determines whether the accelerator position is equal to or greater than a threshold value Th1 (S12). The threshold value Th1 is one of the determination criteria (determination values) for determining whether to perform the driving force suppression, and the driving force suppression is performed if the accelerator position is equal to or greater than the threshold value Th1.

If the accelerator position is determined to be less than the threshold value Th1 (NO at S12), the vehicle control ECU 20 ends the process. In contrast, if the accelerator position is determined to be equal to or greater than the threshold value Th1 (YES at S12), the vehicle control ECU 20 suppresses the driving force to perform collision prevention control (S13). The suppression control process is performed by the driving force control unit 22 provided in the vehicle control ECU 20. Specifically, the driving force control unit 22 makes the driving force command value Fi for the engine 41 smaller than the request value f0 determined based on the accelerator position to perform the suppression control. The initial value f1 is set as the driving force command value Fi except during the raising period for the driving force command value Fi.

Next, the vehicle control ECU 20 acquires state information of the vehicle 10 (S14). As used herein, the vehicle state information to be acquired is information such as the speed of the vehicle, the shift position, and the slope of a road. In the vehicle control ECU 20, the vehicle speed information is acquired from the vehicle speed sensor 31, and the shift position information is acquired from the shift position sensor 34. The vehicle control ECU 20 also acquires the road slope information from the acceleration sensor 33. Then, in the vehicle control ECU 20, the slope of the road on which the vehicle 10 is running is calculated by the slope calculation unit 23 based on the detection result of the acceleration sensor 33. Next, the vehicle control ECU 20 determines whether the road on which the vehicle 10 is running is an uphill road (S15). The determination as to whether the road is an uphill road is performed by determining whether the uphill grade θ calculated based on the detection result of the acceleration sensor 33 is equal to or greater than a predetermined uphill grade.

If it is determined that the road is not an uphill road (NO at S15), the vehicle control ECU 20 ends the process. In contrast, if it is determined that the road is an uphill road (YES at S15), the vehicle control ECU 20 determines whether the driving force command value Fi is currently being raised from the initial value f1 (whether the driving force command value Fi is in the raising period) (S16).

Figure 5:
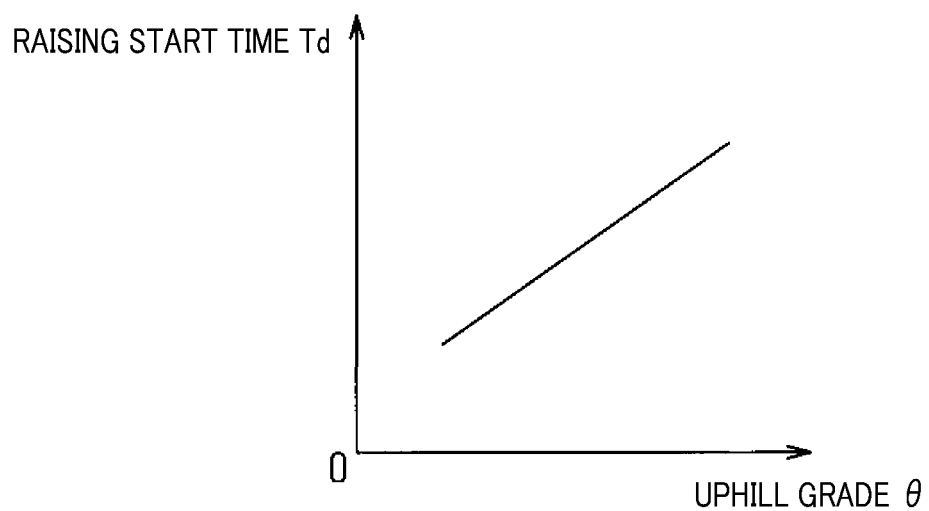
FIG. 5 is a diagram illustrating the relation between raising start time for the driving force command value and uphill grade.

If it is determined that the driving force command value Fi is not in the raising period (NO at S16), the vehicle control ECU 20 sets the raising start time Td for the driving force command value Fi based on the uphill grade θ of the uphill road (S17). The setting process is performed by the increase rate changing unit 24 provided in the vehicle control ECU 20. The raising start time Td for the driving force command value Fi and the uphill grade θ have the relation illustrated in FIG. 5, for example. Specifically, the increase rate changing unit 24 sets the raising start time Td for the driving force command value Fi such that the raising start time Td is longer on uphill roads with larger uphill grades θ.

Next, the vehicle control ECU 20 determines whether the time from the start of suppressing the driving force to the start of raising the driving force command value Fi from the initial value f1 has reached the raising start time Td (predetermined timing) (S18). The determination process is performed by the increase rate changing unit 24. If it is determined that the time has not reached the raising start time Td (NO at S18), the vehicle control ECU 20 ends the process. In contrast, if it is determined that the time has reached the raising start time Td (YES at S18), the vehicle control ECU 20 determines whether the vehicle 10 is in a start restriction state (S19). For example, the start restriction state includes a state where the vehicle 10 is stationary due to a start restriction while the accelerator is on.

If it is determined that the vehicle 10 is not in the start restriction state (NO at S19), the vehicle control ECU 20 ends the process. In contrast, if it is determined that the vehicle 10 is in the start restriction state (YES at S19), the vehicle control ECU 20 raises the driving force command value Fi for the engine 41 (S20), and ends the process. The determination process is performed by the driving force control unit 22. Specifically, the driving force control unit 22 raises the driving force command value Fi by predetermined amounts at predetermined intervals.

If it is determined that the driving force command value Fi is in the raising period (YES at S16), the vehicle control ECU 20 determines whether the speed of the vehicle is equal to or greater than a threshold value Th2 (S21). If it is determined that the speed of the vehicle is less than the threshold value Th2 (NO at S21), the vehicle control ECU 20 advances to the process of step S20, and continues raising the driving force command value Fi. In contrast, if it is determined that the speed of the vehicle is equal to or greater than the threshold value Th2 (YES at S21), the vehicle control ECU 20 resets the driving force command value Fi to the initial value f1 (S22), and ends the process.

In the vehicle control device (vehicle control ECU 20) according to the present embodiment, the following advantageous effects are obtained owing to the above-mentioned configuration.

In the vehicle control device according to the present embodiment, in the case where the actual driving force increases as the driving force command value Fi for the engine 41 is raised, the raising change rate for the driving force command value Fi is changed based on the slope of a road. In short, in the vehicle control device according to the present embodiment, the increase rate per time is changed based on the slope. Therefore, in a vehicle including the vehicle control device according to the present embodiment, the actual driving force moderately increases. Consequently, the vehicle control device according to the present embodiment suppresses an excessive rise in the actual driving force due to a delay in starting the vehicle 10 on an uphill slope. As a result, the vehicle control device according to the present embodiment enables the vehicle 10 to avoid a collision with an object while appropriately generating the driving force required for starting the vehicle 10 in a place including an uphill slope (e.g., uphill road).

As illustrated in FIG. 3, if the raising start time Td for the driving force command value Fi (timing for raising the driving force command value Fi from the initial value f1) is changed, the initial rise in the actual driving force (slope of the rising change) is varied. The vehicle control device according to the present embodiment performs control (driving force control) to gradually raise the driving force of the engine 41 by utilizing this variation property. Consequently, in the vehicle control device according to the present embodiment, the initial rise in the actual driving force can be moderated. When the vehicle control device according to the present embodiment increases the actual driving force, the desired effect of the driving force control can be obtained with the same raising pattern for the driving force command value Fi. Therefore, in the vehicle control device according to the present embodiment, the configuration for implementation can be simplified.

In the case where the vehicle 10 runs on an uphill road, the raising start time Td for the driving force command value Fi is set such that the raising start time Td is longer on roads with larger uphill grades θ, whereby the increase rate for the driving force command value Fi is reduced. Therefore, in the vehicle control device according to the present embodiment, the initial rise in the actual driving force (slope of the rising change) is reduced. In summary, the vehicle control device according to the present embodiment enables the vehicle 10 to avoid a collision with an object while appropriately generating the actual driving force required for starting the vehicle 10 even in the case where a delay in starting the vehicle 10 occurs due to an uphill slope.

Other Embodiments

The vehicle control device according to the present disclosure is not limited to the configuration of the above embodiment. For example, it may be changed as follows.

The above embodiment has described the configuration in which the increase rate for the driving force command value Fi is changed based on the uphill grade θ. In this configuration, the increase rate changing unit 24 provided in the vehicle control ECU 20 changes the increase rate by varying the raising start time Td for the driving force command value Fi based on the uphill grade θ. However, the present disclosure is not limited to this configuration. In a modification, the increase rate changing unit 24 may be configured to change the interval Tc of raising the driving force command value Fi in a stepwise manner based on the uphill grade θ (hereinafter referred to as "configuration (1)"). In configuration (1), the time interval Tc only needs to be set such that the time interval Tc is longer at larger uphill grades θ. Additionally, the increase rate changing unit 24 may be configured to change the raising amount per stepwise rise in the driving force command value Fi based on the uphill grade θ (hereinafter referred to as "configuration (2)"). In configuration (2), the raising amount only needs to be set such that larger raising amounts are applied at larger uphill grades θ. In this manner, according to the modification, the increase rate changing unit 24 performs at least one of configurations (1) and (2).

In the present modification having the above-mentioned configuration, as in the case of the above embodiment, the difference between the driving force command value Fi and the actual driving force can be reduced in the case where the vehicle 10 moves along an uphill slope. Therefore, the initial rise in the actual driving force can be moderated after the driving force command value Fi is raised.

In another modification, the increase rate changing unit 24 may change the increase rate for the driving force command value Fi based on the uphill grade θ and the shift position. In this modification, the vehicle control ECU 20 includes a traveling direction determination unit that determines whether the traveling direction of the vehicle 10 is an anterior direction of the vehicle or a posterior direction of the vehicle. The traveling direction determination unit determines the traveling direction of the vehicle 10 based on the determination result as to whether the current shift position is in the drive range or reverse range which is based on the shift position information provided by the shift position sensor 34. Therefore, the increase rate changing unit 24 only needs to change the increase rate in accordance with the determination result of the traveling direction determination unit.

As described above, in this modification, the increase rate changing unit 24 changes the increase rate for the driving force command value Fi such that different increase rates are set in the respective cases where the vehicle 10 is advanced to approach an object and reversed to approach an object. In another modification having the above-mentioned configuration, the increase rate for the driving force command value Fi can be appropriately changed without causing a feeling of discomfort to a driver in each of the cases where the vehicle 10 is advanced to approach an object and reversed to approach an object.

REFERENCE SIGNS LIST

10 . . . Vehicle, 20 . . . Vehicle control ECU, 21 . . . Object determination unit, 22 . . . Driving force control unit, 23 . . . Slope calculation unit, 24 . . . Increase rate changing unit.

The invention claimed is:

1. A vehicle control device comprising:
an object determination unit configured to determine presence or absence of an object ahead of a vehicle in its traveling direction;
a driving force control unit configured to, in the case where the presence of the object has been determined, raise a driving force command value in the vehicle in a stepwise manner such that the driving force command value does not exceed a request value determined based on a position of an accelerator of the vehicle designated by a driver until a speed of the vehicle reaches a predetermined speed, and lower the driving force command value after the speed of the vehicle reaches the predetermined speed;
a slope calculation unit configured to calculate a slope of a road on which the vehicle runs;
a state determination unit that determines whether the vehicle is in a stopped state despite the accelerator of the vehicle being on; and
an increase rate changing unit configured to change an increase rate per time for raising the driving force command value based on the slope, wherein:
in the case where the presence of the object has been determined, the driving force control unit raises the driving force command value gradually from an initial value until the speed of the vehicle reaches the predetermined speed, the initial value being smaller than the request value, and
on condition that the state determination unit determines that the vehicle is in the stopped state and despite the accelerator of the vehicle being on, the increase rate changing unit is configured to change the increase rate by delaying a timing for raising the driving force command value from the initial value after driving force suppression is started.

2. The vehicle control device according to claim 1, wherein
the increase rate changing unit sets the increase rate such that smaller increase rates are applied on slopes with larger uphill grades.

3. The vehicle control device according to claim 1, comprising:
a traveling direction determination unit configured to determine whether the traveling direction of the vehicle is an anterior direction of the vehicle or a posterior direction of the vehicle in the case where the presence of the object has been determined, and
the increase rate changing unit changes the increase rate in accordance with a determination result of the traveling direction determination unit.

4. A vehicle control method that is executed by a vehicle control device, the vehicle control method comprising the steps of:
determining presence or absence of an object ahead of a vehicle in its traveling direction;
in the case where the presence of the object has been determined, raising a driving force command value in the vehicle in a stepwise manner such that the driving force command value does not exceed a request value determined based on a position of an accelerator of the vehicle designated by a driver until a speed of the vehicle reaches a predetermined speed, and lowering the driving force command value after the speed of the vehicle reaches the predetermined speed;
calculating a slope of a road on which the vehicle runs;
determining whether the vehicle is in a stopped state despite the accelerator of the vehicle being on; and
changing an increase rate per time for raising the driving force command value based on the slope, wherein:
in the case where the presence of the object has been determined, raising the driving force command value gradually from an initial value until the speed of the vehicle reaches the predetermined speed, the initial value being smaller than the request value, and
on condition of determining that the vehicle is in the stopped state and despite the accelerator of the vehicle being on, the increase rate is changed by delaying a timing for raising the driving force command value from the initial value after driving force suppression is started.

* * * * *